(12) United States Patent
Jeong (10) Patent No.: US 10,656,845 B2
(45) Date of Patent: May 19, 2020

(54) SYSTEM AND METHOD FOR MANAGING CONTAINER IMAGE

(71) Applicant: SAMSUNG SDS CO., LTD., Seoul (KR)

(72) Inventor: Chan-Hun Jeong, Seoul (KR)

(73) Assignee: SAMSUNG SDS CO., LTD., Seoul (KR)

(*) Notice: Subject to any disclaimer, the term of this patent is extended or adjusted under 35 U.S.C. 154(b) by 36 days.

(21) Appl. No.: 15/603,591

(22) Filed: May 24, 2017

(65) Prior Publication Data

US 2017/0344289 A1 Nov. 30, 2017

(30) Foreign Application Priority Data

May 25, 2016 (KR) .......................... 10-2016-0064152

(51) Int. Cl.
*G06F 12/00* (2006.01)
*G06F 3/06* (2006.01)
*G06F 16/188* (2019.01)
*G06F 21/64* (2013.01)

(52) U.S. Cl.
CPC ............ *G06F 3/0619* (2013.01); *G06F 3/065* (2013.01); *G06F 3/067* (2013.01); *G06F 16/188* (2019.01); *G06F 21/64* (2013.01)

(58) Field of Classification Search
CPC ........ G06F 3/0619; G06F 3/065; G06F 3/067; G06F 9/455; G06F 17/30233; G06F 21/60
See application file for complete search history.

(56) References Cited

U.S. PATENT DOCUMENTS

| | | | |
|---|---|---|---|
| 6,615,365 B1* | 9/2003 | Jenevein | G06F 11/1417 711/161 |
| 2011/0035618 A1* | 2/2011 | Jann | G06F 11/0712 714/3 |
| 2012/0060004 A1* | 3/2012 | Rope | G06F 3/0623 711/154 |
| 2014/0053150 A1* | 2/2014 | Barnett | G06F 9/455 718/1 |
| 2017/0249469 A1* | 8/2017 | Goyal | G06F 21/62 |

* cited by examiner

*Primary Examiner* — David Yi
*Assistant Examiner* — Tahilba O Puche
(74) *Attorney, Agent, or Firm* — Sughrue Mion, PLLC (57) ABSTRACT

Provided are a system and a method for managing a container image. The container image managing system includes a remote storage configured to store and manage a container image, a container engine configured to mount a storage area of the container image stored in the remote storage and read the container image from the mounted storage area to generate a container, and a local storage configured to store a read-write layer of the generated container.

19 Claims, 9 Drawing Sheets

Container A:1   Container A:2   Container B:1   Container C:1

SYSTEM AND METHOD FOR MANAGING CONTAINER IMAGE

CROSS-REFERENCE TO RELATED APPLICATION

This application claims priority to and the benefit of Korean Patent Application No. 10-2016-0064152, filed on May 25, 2016, the disclosure of which is incorporated herein by reference in its entirety.

BACKGROUND

1. Field

The present disclosure relates to a technology for managing a container image in a container service operating environment.

2. Discussion of Related Art

Recently, usage of a container in application development and distribution has been rapidly increasing. Also, usage of an orchestration technology to operate multiple containers at a plurality of nodes has been increasing.

In a container service, a container image is one of the most important subjects of management. However, conventional technology for operating and managing a container image not only wastes a large amount of storage resources, but also has vulnerability in security. Accordingly, there is a need of a method for effectively managing a container image.

SUMMARY

The present disclosure is directed to providing an effective method of managing a container image, which is capable of reducing wastage of storage resources used to store and operate a container image.

The present disclosure is directed to providing a method of managing a container image, which is capable of improving security of a container image.

According to an aspect of the present disclosure, there is provided a container image managing system, the system including a remote storage configured to store and manage a container image, a container engine configured to mount a storage area of the container image stored in the remote storage and read the container image from the mounted storage area to generate a container, and a local storage configured to store a read-write layer of the generated container.

The container engine may further configured to mount the storage area of the container image as read-only.

The system may further include an image manager configured to perform at least one among generating, correcting, and deleting the container image stored in the remote storage.

The image manager may be further configured to request generation of a replica of the container image from the remote storage based on a request of a correction of the container image, and use the replica of the container image to generate a corrected replica of the container image.

The remote storage may be further configured to replace the container image with the corrected replica of the container image when the corrected replica of the container image is generated by the image manager, and request that the container engine perform a restart of the container, and the container engine may be further configured to read the replaced container image to restart the container based on a request to perform the restart of the container engine.

The image manager may be further configured to manage a name and tag information corresponding to the container image stored in the remote storage.

The system may further include an image registry having stored therein an original representation of the container image stored in the remote storage, and a check server configured to store and manage a check value corresponding to the original representation of the container image.

The image manager may be further configured to perform an integrity check on the original representation of the container image stored in the image registry using the check server, and copy the original representation of the container image to the remote storage based on the integrality check indicating a success.

According to another aspect of the present disclosure, there is provided a method for managing a container image, the method including: mounting, by a container engine, a storage area of a container image of a remote storage in which the container image is stored; reading, by the container engine, the container image from the mounted storage area of the container image to generate a container; and storing, by the container engine, a read-write layer of the generated container in a local storage.

The mounting of the storage area of the container image may comprise mounting the storage area of the container image as read-only.

The method may further include correcting, by an image manager, the container image stored in the remote storage after the storing of the read-write layer of the generated container in the local storage.

The correcting of the container image includes requesting generation of a replica of the container image from the remote storage, and using the replica of the container image to generate a corrected replica of the container image.

The method may further include: replacing, by the remote storage, the container image with the corrected replica of the container image generated by the image manager; requesting, by the remote storage, that the container engine perform a restart of the container engine; and reading, by the container engine, the replaced container image to restart the container.

The method may further include: performing, by an image manager, an integrity check on an original representation of the container image stored in an image registry before the mounting of the storage area of the container image; and copying, by the image manager, the original representation of the container image to the remote storage based on the integrality check indicating a success.

The method may further include: obtaining, by the image manager, a check value corresponding to the original representation of the container image from a check server that is configured to store and manage the check value, wherein check value is used in the performing the integrity check on the original representation of the container image.

According to another aspect of the present disclosure, there is provided a non-transitory computer readable recording medium having embodied thereon a program, which when executed by a processor causes the processor to execute a method, the method including: mounting, by a container engine, a storage area of a container image of a remote storage in which the container image is stored; reading, by the container engine, the container image from the mounted storage area of the container image to generate a container; and storing, by the container engine, a read-write layer of the generated container in a local storage.

The mounting of the storage area of the container image may comprise mounting the storage area of the container image as read-only.

The method may further include correcting, by an image manager, the container image stored in the remote storage after the storing of the read-write layer of the generated container in the local storage.

The correcting of the container image includes requesting generation of a replica of the container image from the remote storage, and using the replica of the container image to generate a corrected replica of the container image.

The method may further include: replacing, by the remote storage, the container image with the corrected replica of the container image generated by the image manager; requesting, by the remote storage, that the container engine perform a restart of the container engine; and reading, by the container engine, the replaced container image to restart the container.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which.

DETAILED DESCRIPTION OF EXEMPLARY EMBODIMENTS

Hereinafter, exemplary embodiments of the present disclosure will be described in detail below with reference to the accompanying drawings. The following description is intended to provide a general understanding of the method, apparatus and/or system described in the specification, and is only illustrative in purpose and is not to be construed as limiting the present disclosure.

In the description of the present disclosure, detailed descriptions that are well-known but are likely to obscure the subject matter of the present disclosure will be omitted in order to avoid redundancy. The terminology used herein is defined in consideration of its function in the present disclosure, and may vary with an intention of a user and an operator or custom. Accordingly, the definitions of the terms should be determined based on the overall content of the specification. The terminology used herein is for the purpose of describing particular embodiments only and is not intended to be limiting to the present inventive concept. As used herein, the singular forms "a," "an," and "the" are intended to include the plural forms as well, unless the context clearly indicates otherwise. It should be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Figure 1:
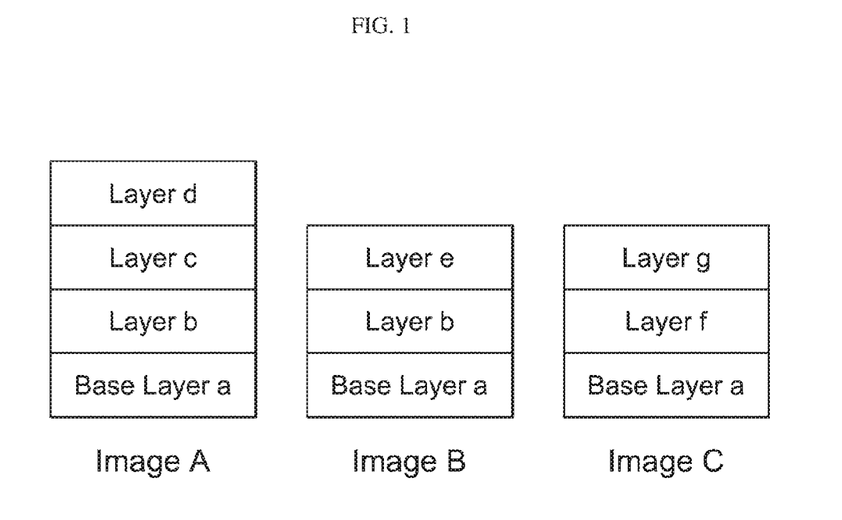
FIG. 1 is an exemplary diagram illustrating a container image according to an embodiment of the present disclosure.

FIG. 1 is an exemplary diagram illustrating a container image according to an embodiment of the present disclosure. In embodiments of the present disclosure, a container refers to a software providing technology for providing an application desired to be run and dependencies needed to run the application, for example, a library, a system tool, and a runtime environment in a package. The container does not include a kernel of an operating system, and thus has superior speed and promptness to and uses fewer resources than a conventional virtual machine. A relationship between a container and a container image is comparable to a relationship between a process and an execution file. In other words, when elements constituting a container exist in a static state in a storage, the elements are referred to as a container image, and when the container image is loaded into an actual memory and enters a process state, the container image is referred to as a container.

In embodiments of the present disclosure, the container image includes a plurality of layers. For example, as shown in FIG. 1, a container image A is configured to include a layer a, a layer b, a layer c, and a layer d. A container image B is configured to include a layer a, a layer b, and a layer e. A container image C is configured to include a base layer a, a layer f, and a layer g. A plurality of layers forming an image is combined into a single file system through the Union Filesystem in a process in which the image is turned into a container.

A lowermost layer of an image, such as the layer a, is generally referred to as a base layer. The base layer includes all elements needed to drive a container, such as a root filesystem, and thus consumes a large amount of storage resources. In particular, the base layer includes a large number of small files, and thus consumes a lot of inodes relative to the block size when compared to general data. Generally, a size of an inode is determined when a file system is formatted, so it is impossible to change the size of the inode while the system is operated except for a special case.

As shown in FIG. 1, each of the container images may commonly use the same layer. For example, the layer a may be commonly used in the images A, B, and C, and layer b may be commonly used in the images A and B.

Figure 2:
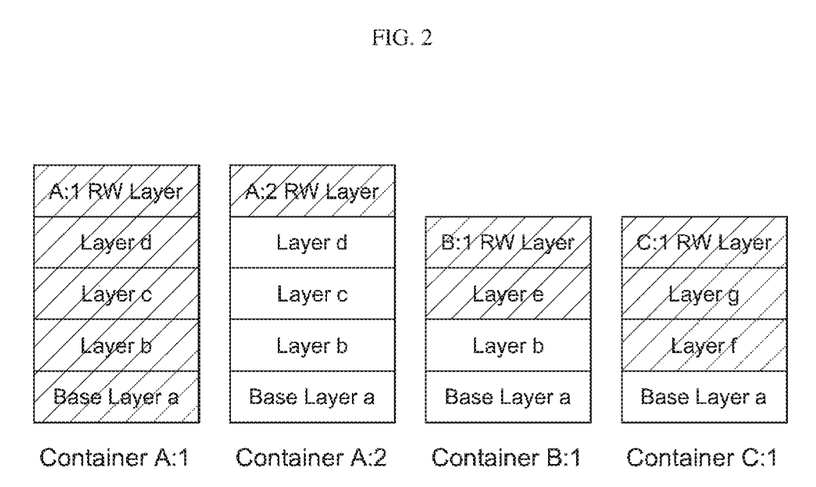
FIG. 2 is an exemplary diagram illustrating a container generated from a container image according to an embodiment of the present disclosure.

FIG. 2 is an exemplary diagram illustrating a container generated from a container image according to an embodiment of the present disclosure. In FIG. 2, an example is illustrated in which containers A:1 and A:2 are generated from the image A, a container B:1 is generated from the image B, and a container C:1 is generated from the image C. As shown in FIG. 2, one or more containers may be generated from a single container image. Also, as shown in FIG. 2, a container generated from an image includes a read-write layer (R/W layer) in an uppermost portion thereof. The R/W layer is a layer provided to store data that is generated or used in the corresponding container.

When a plurality of containers are generated from the same node, layers commonly used in each of the containers may be commonly used through bind mounting and the like. For example, when the container A:1 is generated and then the container A:2 is generated, layers forming the container A:2 except for an upper most RW layer of the container A:2 are bind-mounted on the container A: 1 as a read-only to be commonly used. Similarly, when the container B:1 is generated, the layers a and b are bind-mounted on the container A: 1 as read-only to be commonly used so that only the layer e and a RW layer are generated in an actual storage. That is, in FIG. 2, only the layers represented with diagonal lines use actual storage resources.

Figure 3:
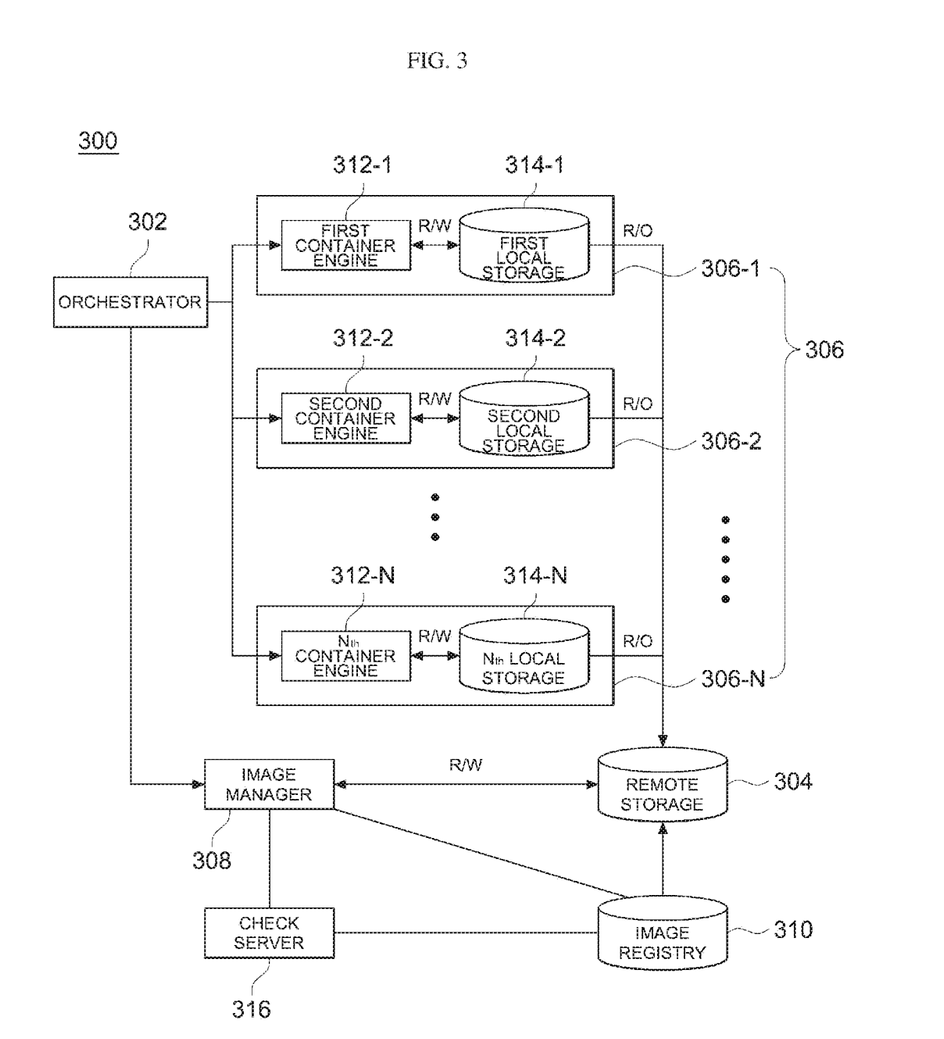
FIG. 3 is a block diagram illustrating a container image managing system according to an embodiment of the present disclosure.

FIG. 3 is a block diagram illustrating a container image managing system 300 according to an embodiment of the present disclosure. The container image managing system 300 according to an embodiment of the present disclosure is a system that generates and operates a container by storing and managing a container image. As shown in FIG. 3, the container image managing system 300 according to an embodiment of the present disclosure includes an orchestrator 302, a remote storage 304, and a plurality of container operating nodes 306.

The orchestrator 302 manages the plurality of container operating nodes 306, and allows one or more containers to be generated and driven through each of the plurality of container operating nodes 306. According to an embodiment of the present disclosure, the orchestrator 302 transmits a request for execution of a container to each container operating node, and each of the container operating nodes that received the request for execution of a container uses an image of the requested container to generate a corresponding container. Also, when a particular container operating node of the container operating nodes 306 has a malfunction and thus a container that is being executed at the container operating node stops operating the orchestrator 302 is configured to use another available node to allow the stopped container to resume execution again for failover.

The remote storage 304 stores and manages one or more container images. Also, the remote storage 304 provides the container image to the container operating node 306 when a request is received from the container operating node 306.

When a request for execution of a container is received from the orchestrator 302, the plurality of container operating nodes 306 are configured to use the container image stored in the remote storage 304 to generate the requested container. The embodiment is illustrated as having N container operating nodes 306-1, 306-2, . . . , and 306-N as an example, but the number of container operating nodes according to the present disclosure is not limited thereto. According to embodiments of the present disclosure, each of the container operating nodes 306 includes a container engine 312 and a local storage 314.

The container engine 312 generates a container by mounting a storage area of a container image stored in the remote storage 304 and reading the container image from the mounted image storage area. According to an embodiment of the present disclosure, the container engine 312 does not download a container image from the remote storage 304, but mounts a container image storage area of the remote storage 304 to directly execute a container image stored in the remote storage 304. To this end, the remote storage 304 may be connected to each of the operating nodes 306 through a native file system interface rather than a communication protocol, such as HTTP/HTTPS. Since the native file system interface is implemented at a driver level in a kernel of an operating system, there is a lower risk of data being subjected to unauthorized use by a man in the middle.

Meanwhile, according to an embodiment of the present disclosure, the plurality of container engines 312 may mount an image storage area of the remote storage 304. Accordingly, the image storage area of the remote storage 304 may be mounted onto one or more container engines 312. In this case, each of the container engines 312 mounts the image storage area as read-only to prevent the container image from being modified by the container engine 312.

The local storage 314 stores a read-write layer of the container generated by the container engine 312. That is, the local storage 314 according to embodiments of the present disclosure does not store all of an image for generating a container, but stores only an upper most layer of the container.

Figure 4:
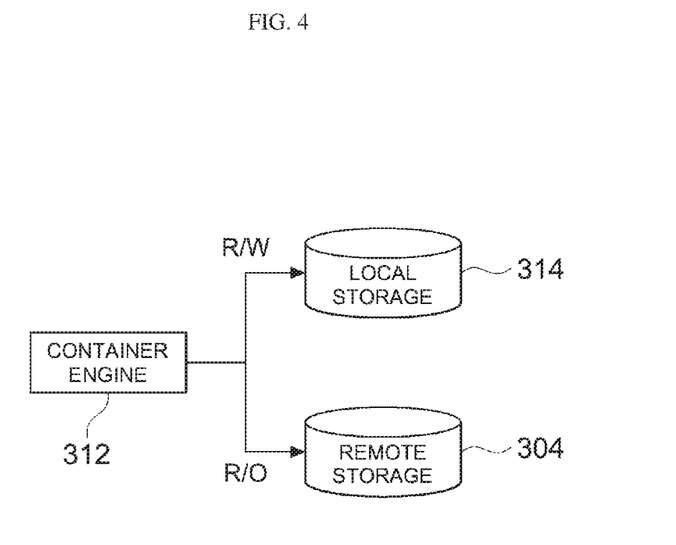
FIG. 4 is an exemplary diagram illustrating a container engine connected to a remote storage and a local storage according to an embodiment of the present disclosure.

FIG. 4 is an exemplary diagram illustrating the container engine 312 connected to the remote storage 304 and the local storage 314 according to an embodiment of the present disclosure. As described above, according to embodiments of the present disclosure, a container image is stored only in the remote storage 304, and the local storage 314 stores a read-write layer of the generated container. Accordingly, each of the container operating nodes 306 does not need to store and manage a replica of the container image so that storage space of the local storage 314 may be effectively managed and the container image may be prevented from being subjected to unauthorized use by the container operating node 306.

Meanwhile, the container engine 312 according to an embodiment of the present disclosure may operate in a hybrid form. For example, the container engine 312 may be configured to operate in one of a standalone mode and a cluster mode. When the container engine 312 operates in the standalone mode, the container engine 312 downloads a container image from the remote storage 304, stores the downloaded container image in the local storage 314, and uses the container image stored in the local storage 314 to drive a container. Also, when the container engine 312 operates in the cluster mode as described above, the container engine 312 uses a storage driver of the operating node 306 to mount the remote storage 304 to a virtual file system of the operating node 306, and directly reads a container image from the remote storage 304 to drive a cluster.

The container image managing system 300 according to an embodiment of the present disclosure may further include an image manager 308, an image registry 310, and a check server (or a verification server) 316.

The image manager 308 performs at least one of generating, correcting, and deleting the container image stored in the remote storage 304.

Figure 5:
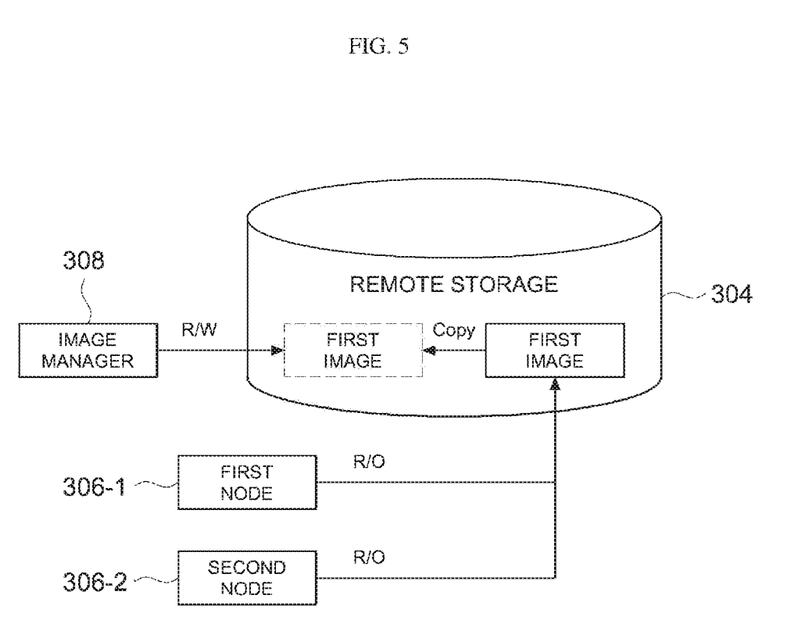
FIG. 5 is an exemplary diagram illustrating a process of an image manager correcting a container image stored in a remote storage according to an embodiment of the present disclosure.

FIG. 5 is an exemplary diagram illustrating a process of the image manager 308 correcting a container image stored in the remote storage 304 according to an embodiment of the present disclosure.

When a request for correcting a container image is transmitted from an administrator or the like, the image manager 308 obtains a lock of the container image. To this end, the image manager 308 requests that the remote storage 304 generate a replica of the container image to be corrected, and performs an image correction process on the generated replica of the container image by the request. As shown in FIG. 4, according to embodiments of the present disclosure, the correction of the image is performed on the replica of the container image rather than on the actual container image so that the image correction process does not influence the container currently being operated. That is, the image correction of the image manager 308 does not exert an influence on containers generated in the container operating nodes 306-1 and 306-2.

The remote storage 304 is configured to replace the container image with a corrected replica of the image when the image manager 308 finishes correcting the replica of the image and request that each node which is using the corresponding container image performs a container restart. In the example of FIG. 4, the remote storage 304 requests that container engines 312-1 and 312-2 of the container operating nodes 306-1 and 306-2 perform the container restart. Then, the container engines 312-1 and 312-2 that received the request perform the container restart by reading the corrected replaced container image.

Meanwhile, the image manager 308 manages a name and tag information corresponding to the container image stored in the remote storage 304. Each image stored in the remote storage 304 has unique identification information (a unique ID), but when actually operated, may be given a new alias by attaching the name and the tag information (Name: Tag) to each identification information for various reasons. In general, a name is given according to a function performed by the corresponding image, and a tag is given to represent a version of the corresponding image. According to the embodiment of the present disclosure, name and tag information of each container image is collectively managed by the image manger 308 to prevent redundancy or mismatching of name/tag information.

The image registry 310 is a storage in which an original representation of the container image stored in the remote storage 304 is stored. Also, the check server 316 stores and manages a check value (or a verification value) corresponding to the original representation of the image stored in the image registry 310. In this case, the check value corresponding to the original representation of the image may be a hash value of the original representation of the image.

The image manager 308 performs an integrity check on the original representation of the image to copy the original representation of the image stored in the image registry 310 to the remote storage 304. First, the image manager 308 obtains the original representation of the image from the image registry 310 and obtains an integrity check value (e.g. a hash value of the original representation of the image). Then, the image manager 308 compares the check value with a check value previously stored in the check server 316 and, when the check value is identical to the previously stored check value, determines that the check is successful. When the integrity check is completed, the image manager 308 stores the original representation of the image obtained from the image registry 310 in the remote storage 304.

Figure 6:
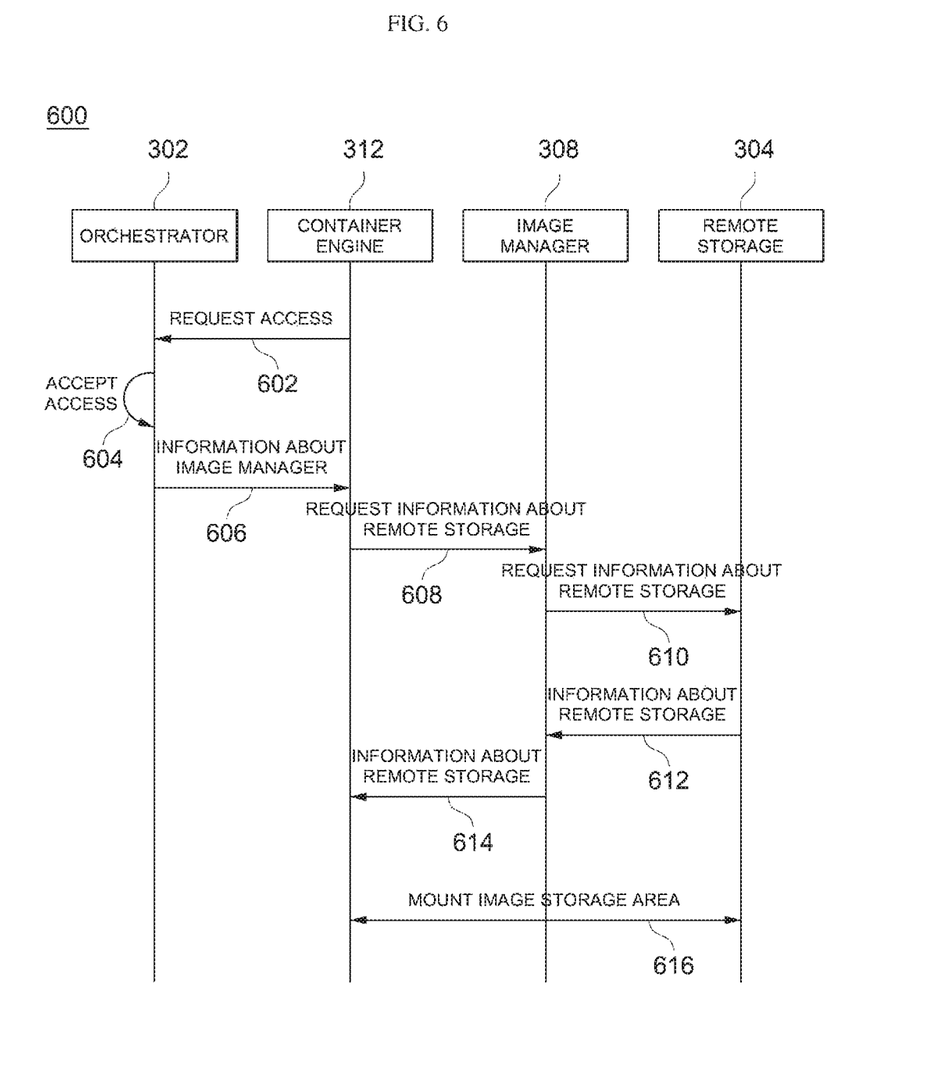
FIG. 6 is a flowchart showing an initialization process by a container image managing system according to an embodiment of the present disclosure.

FIG. 6 is a flowchart 600 showing an initialization process of the container image managing system 300 according to an embodiment of the present disclosure. The flowchart is illustrated under the assumption that the container engine 312 operates in the cluster mode.

In operation 602, the container engine 312 sends the orchestrator 302 a request for access to the orchestrator 302.

In operation 604, the orchestrator 302 authenticates the container engine 312 to accept the access of the container engine 312.

In operation 606, the orchestrator 302 transmits information about the image manager 308 to the container engine 312 that gained the access. The information about the image manager may be network access information of the image manager 308.

In operation 608, the container engine 312 uses the received information to access the image manager 308 and requests information about the remote storage 304 from the image manager 308.

In operation 610, the image manager 308 transfers the received request for remote storage information to the remote storage 304.

In operation 612, the remote storage 304 transmits the information about the remote storage 304 to the image manager 308 in response to the request, and in operation 614, the image manager 308 transfer the received information to the container engine 312. The remote storage information may include access information and mount point information of the remote storage.

In operation 616, the container engine 312 uses the received information to mount an image storage area of the remote storage 304.

Figure 7:
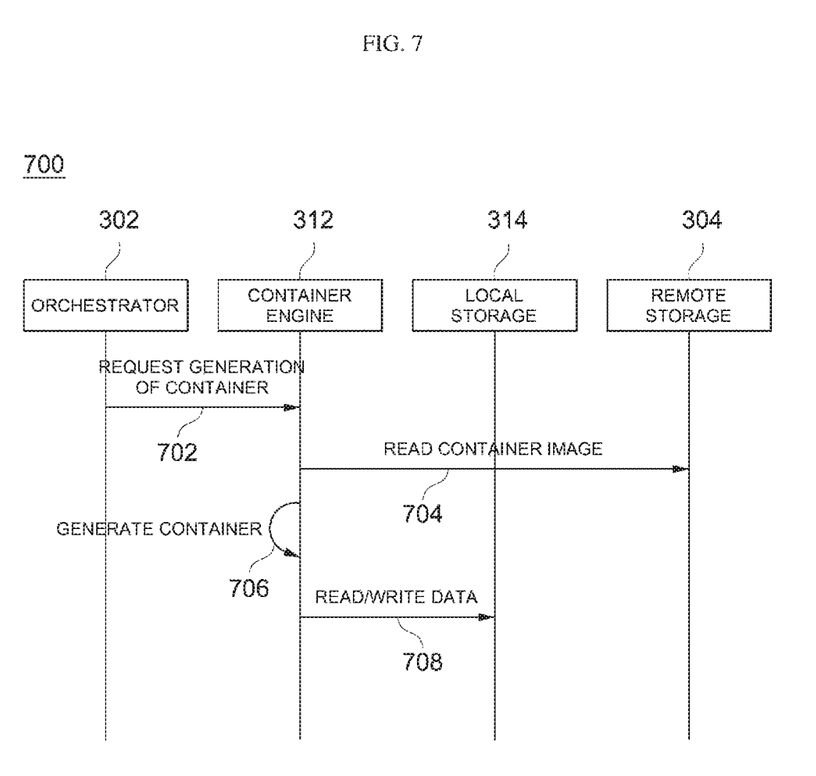
FIG. 7 is a flowchart showing a container generation process by a container image managing system according to an embodiment of the present disclosure.

FIG. 7 is a flowchart showing a container generation process by the container image managing system 300 according to an embodiment of the present disclosure.

In operation 702, the orchestrator 302 transmits a request for generation of a container to the container engine 312.

In operation 704, the container engine 312 that received the request reads a container image from a mounted image storage area of the remote storage 304.

In operation 706, the container engine 312 uses the container image to generate a container.

In operation 708, the container engine 312 stores a read-write layer of the generated container in the local storage 314.

Figure 8:
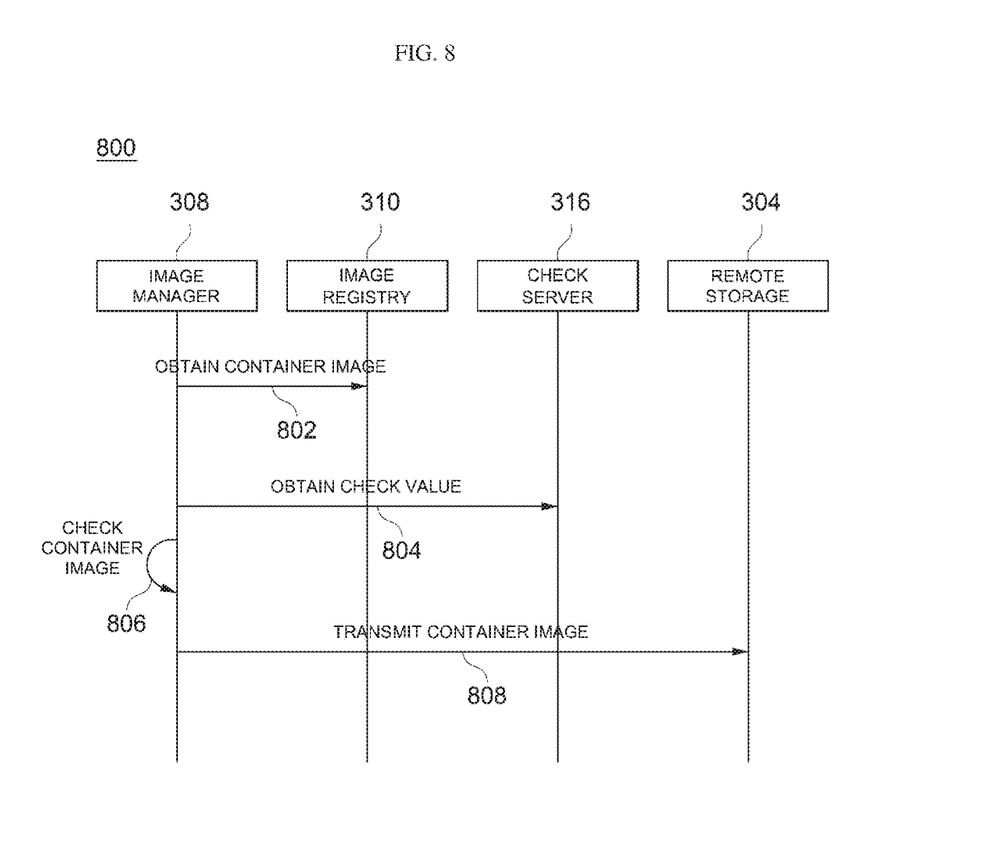
FIG. 8 is a flowchart showing an integrity check process of a container image by a container image managing system according to an embodiment of the present disclosure.

FIG. 8 is a flowchart showing an integrity check process of a container image by the container image managing system 300 according to an embodiment of the present disclosure.

In operation 802, the image manager 308 obtains an original representation of a container image from the image registry 310.

In operation 804, the image manager 308 obtains an integrity check value corresponding to the container image from the check server 316.

In operation 806, the image manager 308 compares a check value calculated from the original representation of the container image with the check value obtained from the check server 316 to perform an integrity check.

In operation 808, when the integrity check is completed, the image manager 308 stores the original representation of the image obtained from the image registry 310 in the remote storage 304.

Figure 9:
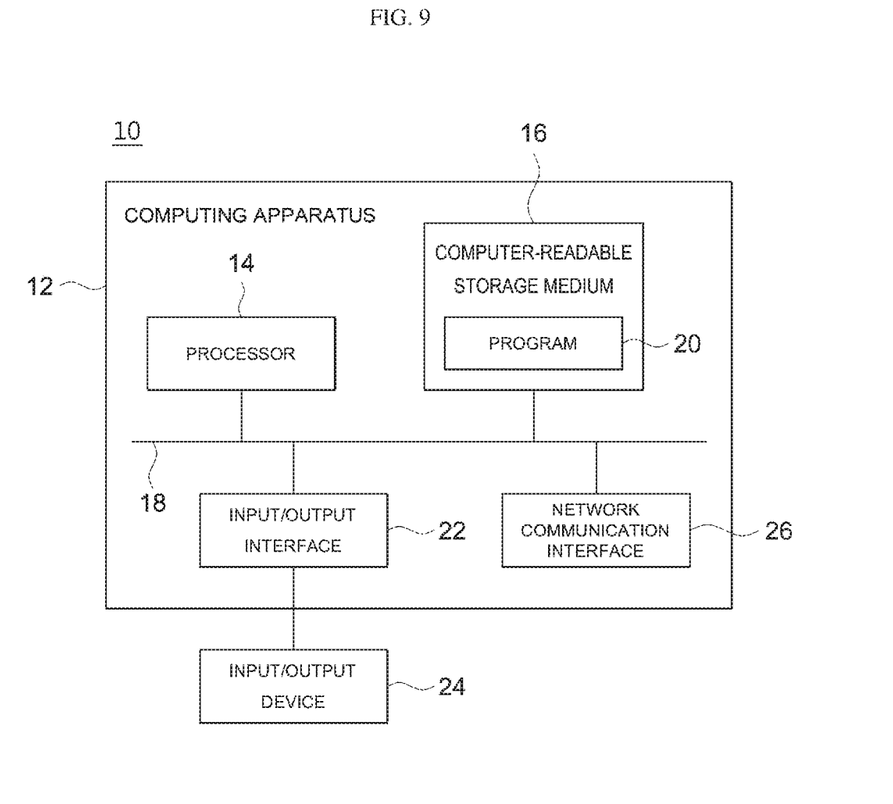
FIG. 9 is a block diagram illustrating a computing environment including a computing apparatus that is suitable for exemplary embodiments.

FIG. 9 is a block diagram illustrating a computing environment 10 including a computing apparatus that is suitable for exemplary embodiments. In the illustrated embodiment, each component may have a functionality and ability different from the following description, and may include additional components in addition to those in the following description.

The computing environment 10 includes a computing apparatus 12. According to an embodiment of the present disclosure, the computing apparatus 12 may be components constituting the container image managing system 300, for example, the orchestrator 302, the remote storage 304, the container operating node 306, the image manager 308, the image registry 310, or the check server 316. The computing apparatus 12 includes at least one processor 14, a computer readable storage medium 16, and a communication bus 18.

The processor 14 may allow the computing apparatus 12 to operate according to the above mentioned embodiment. For example, the processor 14 may execute one or more programs stored in the computer readable storage medium 16. The one or more programs may include one or more computer executable instructions, and the computer executable instruction may allow the computing apparatus 12 to perform operations according to the embodiments of the present disclosure when executed by the processor 14.

The computer readable storage medium 16 is configured to store computer executable instructions and program codes, program data, and/or other types of information. A program 20 stored in the computer readable storage medium 16 includes a set of instructions executable by the processor 14. According to an embodiment of the present disclosure, the computer readable storage medium 16 may be a memory (a volatile memory, such as a random access memory (RAM), a non-volatile memory, or an appropriate combination thereof), one or more magnetic disk storage devices, optical disk storage devices, flash memory devices, and other types of storage media that allow access of the computing apparatus 12 and are capable of storing desired information or appropriate combination thereof.

The communication bus 18 connects various components of the computing apparatus 12, including the processor 14 and the computer readable storage medium 16, to each other.

The computing apparatus 12 may include one or more input/output interfaces 22 to provide an interface for one or more input/output devices 24 and one or more network communication interfaces 26. The input/output interfaces 22 and the network communication interfaces 26 are connected to the communication bus 18. The input/output devices 24 may be connected to other components of the computing apparatus 12 through the input/output interfaces 22. Examples of the input/output device 24 may include a pointing device (a mouse or a track pad), a keyboard, a touch input device (a touch pad or a touch screen), a voice or sound input device, input devices, such as various types of sensor devices and/or photographing devices, and/or output devices, such as a display, a printer, a speaker, and/or a network card. The examples of the input/output device 24 may be included in the computing apparatus 12 as a component that constitutes the computing apparatus 12, or may be connected to the computing apparatus 12 as a separate device distinguished from the computing apparatus 12.

Meanwhile, the embodiments of the present disclosure may include a program to perform the methods described in the specification on a computer and a computer readable recording medium including the program. The computer readable recording medium may include a program instruction, a local data file, a local data structure, or a combination of one or more thereof. The medium may be designed and configured for the present disclosure, or may be generally used in the computer software field. Examples of the computer readable recording medium include magnetic media such as a hard disk, a floppy disk, and a magnetic tape, optical media such as a compact-disc read-only memory (CD-ROM) and a digital versatile disc (DVD), and a hardware device configured to store and execute a program instruction, for example, a read-only memory (ROM), a RAM, and a flash memory. In addition, the program instruction may include a machine code made by a compiler and a high-level language executable by a computer through an interpreter.

As should be apparent from the above, the consumption of storage resources used to store and operate a container image can be reduced by centrally controlling the container image, and also a security of the image can be improved by preventing an unauthorized use of the container image.

Although a few embodiments have been shown and described in detail, it should be apparent to those skilled in the art that various modifications can be made to the above-described exemplary embodiments of the present disclosure without departing from the spirit or scope of the disclosure. Thus, it is intended that the present disclosure covers all such modifications provided they come within the scope of the appended claims and their equivalents.

What is claimed is:

1. A container image managing system, the system comprising:
    a remote storage configured to store and manage a container image;
    a container engine configured to mount a storage area of the container image stored in the remote storage and read the container image from the mounted storage area to generate a container;
    a local storage configured to store a read-write layer of the generated container;
    an image manager configured to perform at least one among generating, correcting, and deleting the container image stored in the remote storage; and
    an orchestrator configured to provide the container engine with access information of the image manager,
    wherein when the container engine generates a plurality of containers using the container image, one or more layers commonly used by each of the plurality of the containers are bind-mounted, and
    wherein the container engine further configured to access the image manager based on the access information of the image manager and obtain, from the image manager, access information of the remote storage and mount point information for the storage area.

2. The system of claim 1, wherein the container engine is further configured to mount the storage area of the container image as read-only.

3. The system of claim 1, wherein the image manager is further configured to request generation of a replica of the container image from the remote storage based on a request of a correction of the container image, and use the replica of the container image to generate a corrected replica of the container image.

4. The system of claim 3, wherein the remote storage is further configured to replace the container image with the corrected replica of the container image when the corrected replica of the container image is generated by the image manager, and request that the container engine perform a restart of the container, and
    the container engine is further configured to read the replaced container image to restart the container based on a request to perform the restart of the container engine.

5. The system of claim 1, wherein the image manager is further configured to manage a name and tag information corresponding to the container image stored in the remote storage.

6. The system of claim 1, further comprising:
    an image registry having stored therein an original representation of the container image stored in the remote storage; and
    a check server configured to store and manage a check value corresponding to the original representation of the container image.

7. The system of claim 6, wherein the image manager is further configured to:

perform an integrity check on the original representation of the container image stored in the image registry using the check server; and copy the original representation of the container image to the remote storage based on the integrality check indicating a success.

8. A method for managing a container image, the method comprising:

obtaining, by a container engine, access information of an image manager which performs at least one among generating, correcting, and deleting a container image stored in a remote storage from an orchestrator;

accessing, by the container engine, the image manager based on the access information of the image manager;

obtaining, by the container engine, access information of the remote storage, and mount point information for a storage area of the container image stored in the remote storage from the image manager;

mounting, by the container engine, the storage area based on the access information of the remote storage and the mount point information;

reading, by the container engine, the container image from the mounted storage area of the container image to generate a container; and storing, by the container engine, a read-write layer of the generated container in a local storage, wherein when the container engine generates a plurality of containers using the container image, one or more layers commonly used by each of the plurality of the containers are bind-mounted.

9. The method of claim 8, wherein the mounting of the storage area of the container image comprises mounting the storage area of the container image as read-only.

10. The method of claim 8, wherein the method further comprises:

correcting, by the image manager, the container image stored in the remote storage after the storing of the read-write layer of the generated container in the local storage.

11. The method of claim 10, wherein the correcting of the container image comprises requesting generation of a replica of the container image from the remote storage, and using the replica of the container image to generate a corrected replica of the container image.

12. The method of claim 10, wherein the method further comprises:

replacing, by the remote storage, the container image with the corrected replica of the container image generated by the image manager;

requesting, by the remote storage, that the container engine perform a restart of the container; and reading, by the container engine, the replaced container image to restart the container engine.

13. The method of claim 8, wherein the method further comprises:

performing, by the image manager, an integrity check on an original representation of the container image stored in an image registry before the mounting of the storage area of the container image; and copying, by the image manager, the original representation of the container image to the remote storage based on the integrality check indicating a success.

14. The method of claim 13, wherein the method further comprises obtaining, by the image manager, a check value corresponding to the original representation of the container image from a check server that is configured to store and manage the check value, wherein the check value is used in the performing the integrity check on the original representation of the container image.

15. A non-transitory computer readable recording medium having embodied thereon a program, which when executed by a processor causes the processor to execute a method, the method including:

obtaining, by a container engine, access information of an image manager which performs at least one among generating, correcting, and deleting a container image stored in a remote storage from an orchestrator;

accessing, by the container engine, the image manager based on the access information of the image manager;

obtaining, by the container engine, access information of the remote storage, and mount point information for a storage area of the container image stored in the remote storage from the image manager;

mounting, by the container engine, the storage area based on the access information of the remote storage and the mount point information;

reading, by the container engine, the container image from the mounted storage area of the container image to generate a container; and storing, by the container engine, a read-write layer of the generated container in a local storage, wherein when the container engine generates a plurality of containers using the container image, one or more layers commonly used by each of the plurality of the containers are bind-mounted.

16. The non-transitory computer readable recording medium of claim 15, wherein the mounting of the storage area of the container image includes mounting the storage area of the container image as read-only.

17. The non-transitory computer readable recording medium of claim 15, wherein the method further includes correcting, by the image manager, the container image stored in the remote storage after the storing of the read-write layer of the generated container in the local storage.

18. The non-transitory computer readable recording medium of claim 17, wherein the correcting of the container image comprises requesting generation of a replica of the container image from the remote storage, and using the replica of the container image to generate a corrected replica of the container image.

19. The non-transitory computer readable recording medium of claim 17, wherein the method further includes:

replacing, by the remote storage, the container image with the corrected replica of the container image generated by the image manager;

requesting, by the remote storage, that the container engine perform a restart of the container; and reading, by the container engine, the replaced container image to restart the container engine.

* * * * *